Figure 1:
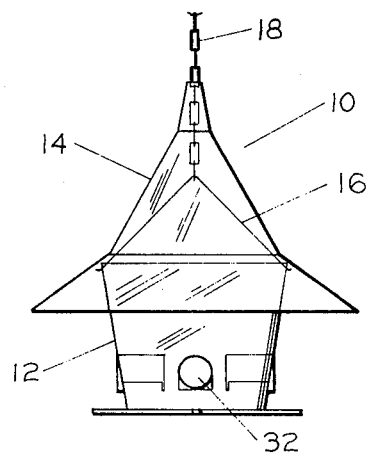

United States Patent [19]

Fisher, Jr.

[11] 3,977,363

[45] Aug. 31, 1976

[54] BIRD FEEDER

[76] Inventor: James B. Fisher, Jr., 2 Graybridge Lane, St. Louis, Mo. 63124

[22] Filed: June 27, 1975

[21] Appl. No.: 591,006

[52] U.S. Cl. ............................................ 119/52 R
[51] Int. Cl.² ........................................ A01K 39/00
[58] Field of Search ................. 119/52 R, 51 R, 55

[56] References Cited
UNITED STATES PATENTS

| | | | |
|---|---|---|---|
| 2,344,367 | 3/1944 | Pueschel | 119/52 R |
| 2,705,938 | 4/1955 | Greenough | 119/52 R |
| 2,786,446 | 3/1957 | Newman | 119/52 R |
| 3,568,641 | 3/1971 | Kilham | 119/51 R |
| 3,717,126 | 2/1973 | Falcone et al. | 119/52 R |

Primary Examiner—Hugh R. Chamblee
Attorney, Agent, or Firm—Glenn K. Robbins

[57] ABSTRACT

A squirrel proof bird feeder having bird feeder holes of a construction to minimize loss of seed by scattering or wind blowing. The bird feeder has a removable conical top of an inverted hip roof construction with the major portion of the upper region of the top having a steep pitch with the lower eaves or border having a gentle pitch which construction tends to dump a squirrel climbing upon the roof from a suspended chain. The bird feeder housing has feeder holes which communicate with the interior through horizontal feeder tubes which are open on the bottom and closed by a baffle at the inner end which while permitting a flow of seed under the end portion of the feeder tube and under the bottom sides restricts the flow when the bird feeder is blown by the wind or otherwise disturbed by feeding birds or squirrels climbing on the top of the feeder.

7 Claims, 5 Drawing Figures

BIRD FEEDER

SUMMARY OF THE INVENTION

It has been a problem in the past to provide bird feeders which are not disturbed by squirrels. Squirrels and other predators are constantly endeavoring to climb upon a bird feeder and not only drive away the birds but also feed upon the seed and scatter it with consequent loss.

By means of this invention there has been provided a bird feeder which is substantially squirrel proof and can be simply suspended by a chain or the like from a branch of a tree or other support. The bird feeder has a removable top which can be lifted vertically to charge the feeder housing with seeds. The removable top is of special so-called inverted hip roof construction with the upper portion of the roof having quite a steep pitch and the lower eaves or border portion having an overhanging baffle like construction of lesser pitch. This construction tends to make it quite difficult for the squirrel to find a support upon the roof and through the overhanging eaves causes him to move away from the center of the feeder which in turn cause swinging of the feeder to one side of the chain because of the weight displacement change and dumping of the squirrel from the feeder to the ground. Further, construction of the feeder from a hard surface plastic such a polystyrene or the like provides a hard slick surface which makes it difficult for the squirrel to find a surface for grasping or traction. A clear plastic construction also makes available the interior of the bird feeder for visibility with regard to the amount of charge and also makes it possible for the birds to see the charge and permit the viewer to watch the birds while feeding.

The bird feeder housing is of an inverted frustoconical configuration having a flat base and upwardly diverging side walls. The removable roof nests simply upon the upper portion of the housing and rests there upon by gravity in a nested relationship.

A special bird feeder hole construction minimizes loss of seed through wing disturbance or scattering caused by the squirrel or other predators climbing upon the feeder and moving it from side to side. The feeder hole construction provides entry for the birds feeding from the perch to feed through holes which communicate with radially and inwardly extending feeder tubes which are open at the bottom portion and closed by a vertical baffle at the inner end. This vertical baffle extends slightly below the bottom opening of the feeder tubes and prevents too large a flow of feed from the interior to the feeder tubes when the bird feeder is swung from side to side either by wind action or other forces such as a squirrel climbing upon the bird feeder.

The above features are objects of this invention and further objects will appear in the detailed description which follows and will be otherwise apparent to those skilled in the art.

For purpose of illustration of this invention there is shown in the accompanying drawings a preferred embodiment thereof. It is to be understood that these drawings are for the purpose of example only and that the invention is not limited thereto.

Figure 2:
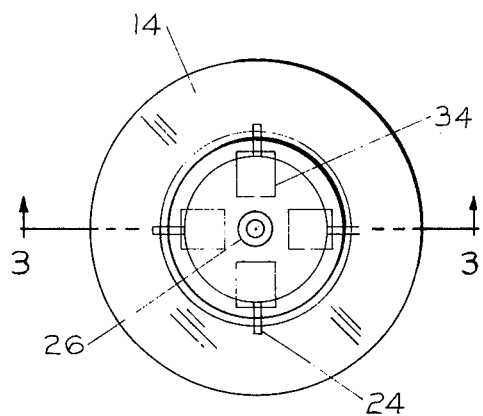
Figure 3:
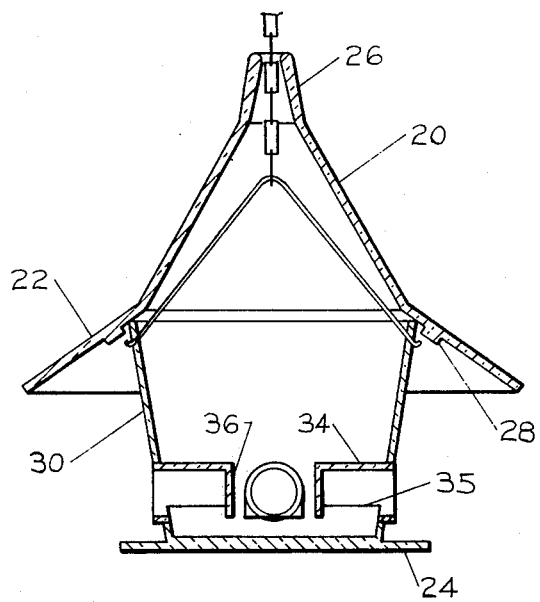
Figure 4:
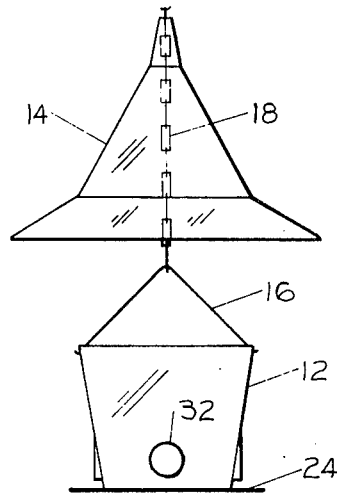
Figure 5:
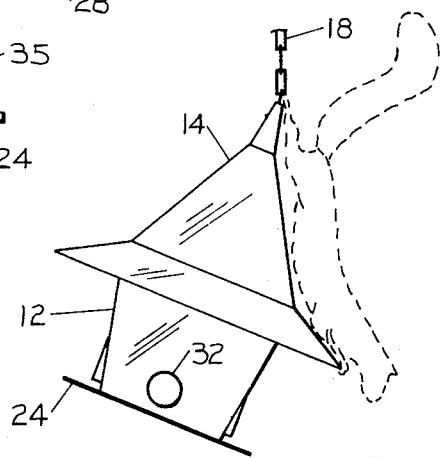

IN THE DRAWINGS:

FIG. 1, is a view in side elevation of the bird feeder.
FIG. 2, is a top plan view of the bird feeder.
FIG. 3, is an enlarged view in section taken on the line 3—3 of FIG. 2.
FIG. 4, is a view taken similarly to FIG. 1, but with the interior construction removed and showing the roof removed for charging and
FIG. 5, is a view taken similarly to FIG. 1, with the interior construction removed and showing the swinging action provided by a hungry squirrel.

DESCRIPTION OF THE INVENTION

The bird feeder of this invention is generally identified by the reference numeral 10 in FIG. 1. It is comprised of a housing 12 which is adapted to be filled with bird feed and a removable roof 14. The bird feeder is suspended by a suspension wire 16 connected to the housing and a chain 18 connected to a tree limb or other type of support.

The removable roof 14 is best shown in FIG. 3. As there shown it is of a generally inverted hip roof construction having an upper conical portion 20 of a quite steep pitch of about 50° to 70°. A lower eaves or border portion 22 has a much lesser or shallower pitch of about 30° to 40° and extends to the side of the bird feeder and over perches 24 connected to the bottom of the housing in protective relation. A top of the roof has a tapering nipple portion 26 which fits loosely around the chain 18 and has a thickened top edge for additional rigidity and support. The underneath side of the eaves has protruding stud elements 28 which serve as stops or guide means to seat the roof upon the tip of the housing.

The housing 12 is likewise best shown in FIG. 3. It is of a generally frustoconical configuration having upwardly diverging side walls 30 which nest within the studs 28 of the underneath portion of the roof. Bird feeder openings 32 are placed above the radially extending perches 24 and communciate with the interior of the housing through bird feeder tubes 34 which extend radially inwardly. The ends of the tubes have a downwardly extending closure baffle 36 which extend slightly below the open bottom portion 35 of the tubes. This construction permits the flow of the bird feed around the sides of the bird feeder tubes so that the feeding bird may have access to bird feed. The baffles extend slightly lower to resist a greater flow pressure from the center of the bird feeder housing to ensure that when the housing is moved from side to side bird feed does not flow unduly in to the bottom opening and out the feeder hole.

The entire construction of the bird feeder may be made of transparent plastic such as high impact polystyrene or the like. Such types of hard plastic construction lend themselves to simplified manufacture and also most importantly provide hard slick surfaces making it difficult for the squirrel to find holding or grasping means on the roof. Further, visibilty to the interior of the housing is provided to keep track of the feed capacity and also serves as an attraction to birds.

Use

The bird feeder of this invention is adapted for very simple installation and use. By means of the chain 18 connected to the hanger wire 16 the feeder can be connected simply to any accessible tree limb or other type of support where it is hung at about four feet or so off the ground to prevent animals from jumping towards the feeder. The feeder is charged simply by raising the roof as shown in FIG. 2, and filling the housing to the desired level with bird seed or other types of bird feed. After filling the roof is simply lowered in nested position on the top of the housing by gravity. The guide studs 28 serve to guide the roof into automatic nested or seated position.

In use the bird simply lights upon the perch 24 and feeds from the feeder holes 32 in a conventional fashion. This feeding is carried out by the bird feeding from the perch upon the feed in the feeder tubes 34. Loss of feed by the pecking at the food is minimized since the feed is contained within the housing. Further, when the feeder is swung from side to side either by wind action or by climbing squirrels the baffle 36 restricts the flow of feed that might be otherwise lost through the bottom opening of the tube and out the feeder holes.

Protection against loss of feed to squirrels or other climbing animals such as cats or the like is vividly shown in FIG. 5. A climbing squirrel descending from the chain of the bird feeder will tend to tip the bird feeder to one side due to the weight of the squirrel. When this occurs the squirrel in unceremoniously dumped to the ground since the pitch of the upper portion of the roof is so steep that the body of the squirrel is directed away from the bird feeder. Further, the overhanging eaves cause the squirrel to be displaced from the housing so it can not grasp the perches 24 which terminate inwardly of the outer edge of the eaves. Thus an effective protection against squirrels is provided.

Various changes and modifications may be made within this invention as will readily apparent to those skilled in the art and are within the scope and teaching of this invention as defined by the claims appended hereto.

What is claimed is:

1. A bird feeder comprising of feeder housing having substantially vertical walls and a flat bottom, said vertical walls being provided with feeder holes, bird perches connected at the bottom of the housing underneath the feeder holes and a conical top supported on a top rim of the vertical walls providing protection against predators climbing thereon, said conical top having an inverted integral hip roof construction, an upper portion of which has a relatively steep pitch extending substantially to the upper portion of the vertical walls of the feeder housing and a lower eaves portion having a relatively shallow pitch extending outwardly over the perches and substantially beyond the housing, the upper portion of the conical roof having a pitch of about 50° to 70° and the lower portion having a pitch of about 30° to 40°.

2. The bird feeder of claim 1 in which the housing is connected to a wire handle receiving a chain means passing through a nipple member at the top of the roof for attachment to a limb support or the like.

3. The bird feeder of claim 1, in which the conical roof is removable and the under side of the eaves portion of the conical roof has guide members receiving inside thereof the top edges of the wall of the housing.

4. The bird feeder of claim 1 in which the housing is connected to a wire handle receiving a chain means passing through a nipple member at the top of the roof for attachment to a limb support or the like, the conical roof is removable and the under side of the eaves portion of the conical roof has guide members receiving inside thereof the top edges of the walls of the housing.

5. The bird feeder of claim 1, in which the housing has feeder tubes of the same diameter as the feeder holes connected to the exterior of the housing and surrounding said holes, said feeder tubes having a bottom portion open to provide bird feeding access within the housing, said feeder tubes being spaced slightly above the bottom of the housing and having a substantially vertical baffle extending slightly below the bottom of the feeder tubes to restrict flow of feed when the bird feeder is tilted.

6. The bird feeder of claim 1, in which the conical roof is made of a plastic having a hard smooth surface to inhibit traction by a predator and the housing is made of transparent plastic to provide for viewing the interior.

7. A bird feeder comprising a feeder housing having substantially vertical walls and a flat bottom, said vertical walls being provided with feeder holes, bird perches connected at the bottom of the housing underneath the feeder holes, a conical roof top supported on a top rim of the vertical walls, a wire handle connected with said feeder housing and receiving a chain means passing through a small opening in the roof top for attachment to a limb support or the like, said roof top resting by gravity on the top of the housing and being liftable vertically along the chain to provide access to the top of the housing for easy placement of feed therein.

* * * * *